United States Patent [19]

La Stella et al.

[11] Patent Number: 4,599,858
[45] Date of Patent: Jul. 15, 1986

[54] OCEAN WAVE ENERGY DEVICE

[76] Inventors: Joseph P. La Stella, R.F.D. #2, Rte. 202, Yorktown Heights, N.Y. 10458; Michael G. Tornabene, 285 Oak Neck La., West Islip, N.Y. 11795

[21] Appl. No.: 844,573

[22] Filed: Oct. 25, 1977

[51] Int. Cl.⁴ ............................................. F03B 13/12
[52] U.S. Cl. ...................................... 60/497; 290/42; 290/53
[58] Field of Search ................. 60/495, 496, 497, 501, 60/507, 498; 290/53, 42

[56] References Cited
U.S. PATENT DOCUMENTS

| | | | |
|---|---|---|---|
| 3,668,412 | 6/1972 | Vrana et al. | 290/53 |
| 3,959,663 | 5/1976 | Rusby | 290/53 |
| 4,355,511 | 10/1982 | Jones | 60/504 X |

Primary Examiner—Stephen F. Husar
Attorney, Agent, or Firm—Morgan, Finnegan, Pine, Foley & Lee

[57] ABSTRACT

A buoy type wave energy extraction construction in which the natural frequency of vertical oscillation of the buoy is mechanically altered to at least partially conform to the wave frequency occurring during a period of operation, whereby the maximum amount of energy available from each successive wave front is extracted. The device includes a buoy, a vertically oscillating shaft supporting said buoy, a horizontally oriented motion output means driven by said vertical shaft, a braking means for arresting movement of the buoy at its uppermost limit of travel during any given oscillation, said braking means holding the buoy until the buoy may be dropped under gravity into a following wave trough.

6 Claims, 2 Drawing Figures

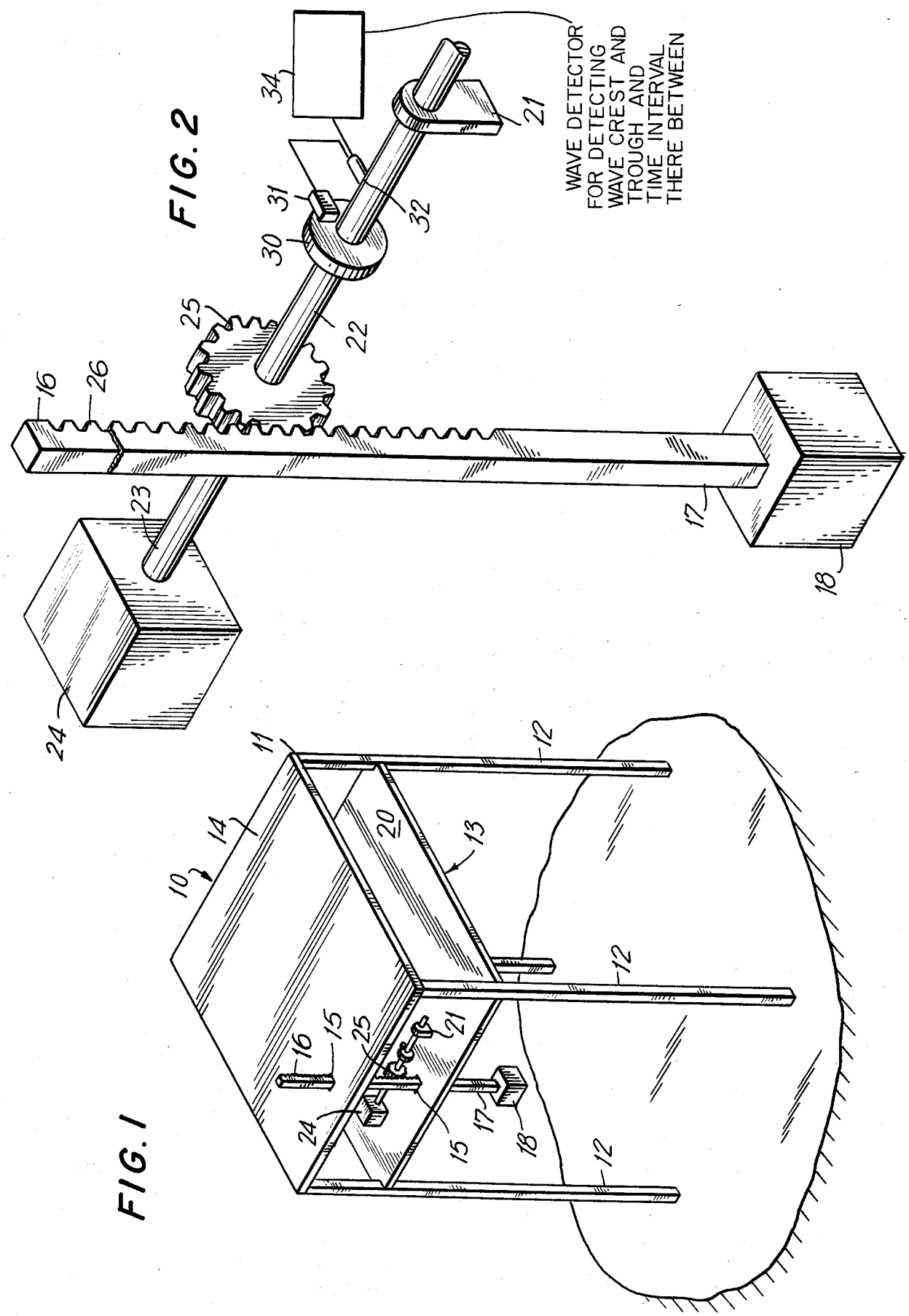

OCEAN WAVE ENERGY DEVICE

BACKGROUND OF THE INVENTION

This invention relates generally to the field of ocean wave energy devices, and more particularly to an improved form adapted to extract maximum energy from each vertical oscillation.

It is known in the art to extract energy by causing an ocean wave to raise and lower a float or buoy in a vertical plane and thereby produce a working force. Workers skilled in this art readily acknowledge that only a small fraction of the total energy contained in a given ocean wave can be captured by any given float or buoy system, unless the natural oscillation frequency of the buoy is in resonance with the then existing ocean wave frequency (wave period). If the frequency of the buoy system is close to, or can be matched, to the wave period, the energy which can be captured is greatly increased. In reality, this state of resonance is very difficult to achieve because ocean wave periods commonly vary from as little as four seconds to as much as twenty second intervals. Floats and buoys, however, have only one natural frequency which is based upon the mass and geometric shape thereof. Therefore, a buoy has only one frequency which will be in resonance with a wave period and all other ocean wave periods will be outside this natural frequency and result in an inefficient energy conversion system.

Another problem of attempting to match natural buoy frequency with ocean wave period frequency lies in the fact that in order to construct a buoy with a natural frequency in the range of ocean wave periods, the buoy construction becomes both very large in terms of mass and awkward in terms of shape.

SUMMARY OF THE INVENTION

It is therefore among the principal objects of the present invention to provide a means of altering the natural frequency of floats and buoys so that the retrieval of energy from ocean waves is substantially increased.

Another object of the invention lies in the provision of means for introducing an artificial resonant condition in a float or buoy with respect to the frequency of existing ocean waves.

Yet another object of the invention lies in the provision of means whereby the natural frequency of given floats or buoys may be constantly altered, so as to follow the change of ocean wave frequencies during operation.

A further object of the invention lies in the provision of means for creating a condition in which potential energy is allowed to accumulate to a maximum in a buoy or float, to be subsequently released in sequence with ocean wave frequency, thus providing means for capturing energy quantities in excess of those quantities theoretically calculated to exist with natural resonance between buoys and sea waves.

Still another object of the invention lies in the provision of means for altering the natural frequency of floats and buoys so that they can be put out of resonance with respect to the frequency of existing ocean waves, thus providing a safeguard to control the damaging effects of uncontrolled resonance between floats and buoys, and the ocean waves.

Briefly stated, the invention contemplates the provision of braking means, the operation of which is controlled by the determination of existing wave frequency, and which arrests movement of the buoy at its uppermost limit of travel, to hold the buoy motionless until the wve crest has past, and subsequently release the buoy so that it may fall under gravity into the following trough to be elevated by the buoyancy of the water below the surface, in addition to the lifting force provided by the next wave crest.

BRIEF DESCRIPTION OF THE DRAWING

In the drawing, to which reference will be made in the specification, similar reference characters have been employed to designate corresponding parts throughout the several views.

FIG. 1 is a schematic view in perspective of an embodiment of the invention.

FIG. 2 is an enlarged schematic view in perspective corresponding to the upper left hand portion of FIG. 1.

DETAILED DESCRIPTION OF THE DISCLOSED EMBODIMENT

In accordance with the invention, the device, generally indicated by reference character 10, comprises broadly; an elevated platform or rig 11 supported from an ocean bed by a plurality of pillars 12, and including a lower platform 13 and an upper platform 14. Aligned openings 15 in the platforms 13 and 14 mount bearings (not shown) for guiding a vertical shaft 16 for movement along a vertical axis. The lower end 17 of the shaft supports a float or buoy 18 of considerable mass.

Mounted on the upper surface 20 of the lower platform 13 are one or more bearings 21 supporting a horizontal shaft 22 for rotation. One end 23 of the shaft mounts a power output means 24 of well known type. The means 24 may be a direct current generator having rectification means (not shown) for providing an output of current irrespective of the direction of rotation of the shaft 22.

The shaft 22 is driven through the cooperation of a pinion 25 with a rack 26 on the shaft 16. As the details of this particular form of motion transmission in ocean wave energy devices is well known in the art, it need not be further considered herein.

Also mounted on the horizontal shaft 22 is a brake disc 30 controlled by an electrically operated caliper 31. The calipers are energized by the operation of a revolutions perminute sensor 32 in such manner that a signal is transmitted upon a detection of zero revolutions per m inute. The calipers are released by operation of a wave frequency detector 34 of known type, for example, Model 23766 Wave Measuring System manufactured by Baylor Company, Houston, Tex., which indicates the presence of a wave trough between successive wave crests and the time interval therebetween. Such information is transmitted in relationship to the time interval and distance between the wave frequency detector and the buoy to revolution per minute sensor 32, at which time the release of the calipers 31 permits the shaft 16 and flat 18 to descend under the action of gravity to enter the trough, and project below the surface until developed buoyancy commences an upward movement.

Thus, during each oscillation, the buoy will be raised to the maximum degree possible, depending upon the buoyancy already developed, and enhanced by the height of the wave crest. As the crest is reached, and the force of gravity overcomes the upward inertia, the revolutions per minute sensor will detect the high point, and actuate the brake to hold the buoy at this point. The brake, once engaged, will halt further motion of the system for a finite period of time. This time can be selected and will have a direct relationship to the ocean wave period of frequency to be matched. After the selected period of time has transpired, the brake will disengage allowing the buoy and buoy shaft to fall and plough back into the water. During the time interval that the disc brake was engaged, the crest of the ocean wave passed beneath the buoy and continued on its path. The approaching trough of the ocean wave causes the water to recede beneath the buoy and allow the buoy to lose its buoyant force and develop potential energy.

The buoy will reenter the water on its downstroke in sequence with the lowest point of the trough of the wave, thus allowing the buoy to be accelerated by gravity through a maximum vertical distance, thus converting its potential energy to kinetic energy.

After the buoy reenters the water, it begins to decelerate, and eventually comes to rest at the low point of its downward vertical movement. The revolutions per minute detector again detects zero revolutions, and sends a signal to the disc brake, whereby, the system is again held in the low position for a predetermined interval of time. During this time interval, the trough of the wve passes and the water begins to rise as the next wave crest approaches. Since the buoy is held in low position, the rising water increases the buoyant force on the buoy to a maximum displacement which will occur near the crest of the approaching wave. At this point in time, the disc brake is released, allowing the maximum buoyant force of the buoy to accelerate the buoy and shaft in the vertically upward direction.

The time interval that the system is halted in the low position is designed to allow the buoy to develop its own buoyant force to a maximum (potential energy) and is also designed to allow the buoy to reach the top of its stroke on the upstroke in sequence with the crest of the next approaching wave, thus allowing the buoy to be accelerated by the buoyant force through a maximum vertical distance, and converting its potential energy to kinetic energy.

It may be noted that where the structure commences operation from rest, during the first cycle, the upward motion of the buoy is only due to the lifting effect of the wave crest. On the second cycle, the upward motion of the buoy is accelerated due to a buoyant force on the buoy developed by restraining the buoy in the low position and then releasing it, so that it will reach the top of its stroke in conjunction with the wave crest of the second cycle. As the buoy is accelerated during the second cycle in an upward direction, it will travel higher than in the first cycle, and thus develop more potential energy. Consequently, when the buoy is released from the high point on the second cycle, the buoy will plunge deeper into the trouch of the following wave before coming to a halt. This increase in total displacement will continue until a point of equilibrium is reached, taking into account the fact that energy is being removed during each cycle. It has been noted during tests that using this artificially created resonance, upward buoy displacements which are even greater than the wave heights are possible, even when significant quantities of energy are being extracted.

As a result, it is possible to obtain vertical displacements of the buoy which are greater than that which would occur if it were possible to tune the buoy to follow the resonance of the wave cycle.

It has also been noted that even if the buoy cycle is slightly out of phase with the wave cycle, buoys will still exhibit increased vertical displacements as long as the buoy frequency cycle is close to that of the wave frequency cycle.

It follows that when the device is not in operation, as when there is no power take off, the disc brake may be used to either lock the buoy in an upward position, or to alter the frequency to halt resonance. In this regard, the time interval of the disc brake engagement can be controlled either manually or automatically by a monitoring system.

Instead of using a wave detector for matching buoy frequency, it is also possible to utilize a monitoring system to constantly hunt for the proper timing interval for the disc brake engagement by monitoring the power take off energy and adjusting the timing interval (in increments) until the maximum energy from the power take off is realized. For example, if the proper disc brake engagement interval is two seconds for a given wave frequency system, the monitoring system is arranged to increase the time interval of the disc brake engagement until it reaches the two second interval, during which time the power take off would be increasing energy output with each increase in time interval. When the increases in time interval passes two seconds, the power take off output would decrease, and the monitoring system, sensing the decrease in energy, would start decreasing the time interval in search of the maximum output interval. This method has the added advantage of being able to compensate for the damping effect of any power take off on the total system response.

It should be noted that it is not absolutely necessary for the disc brake to hold the main shaft motionless during its engagement interval to accomplish the above described controlled resonance between the buoy and the wave. If the brake retards the rotation of the main shaft for a period of time on each stroke during the natural buoy response to the sea wave in a similar fashion, the mechanical energy which can be extracted from the system is still increased, although to a lesser degree.

I wish it to be understood that I do not consider the invention limited to the precise details of structure shown and set forth in this specificatin, for obvious modifications will occur to those skilled in the art to which the invention pertains.

I claim;

1. In an ocean wave energy device of a type including a buoy which reciprocates in a substantially vertical direction in response to successive waves of variable frequency passing therebeneath, said buoy being supported upon a substantially vertically oriented shaft and a power take off means including a shaft driven by movement of said vertical shaft, the improvement comprising: wave frequency detector means for detecting the instantaneous frequency of a wave passing said detector and which will thereafter pass said buoy by monitoring the contour of each wave as such wave passes such wave frequency detector means and measuring the time interval between the crest and following trough and between the trough and following crest of each such wave and means for imposing an artificial resonance to said buoy whereby said buoy resonance may be substantially conformed to the frequency of the wave at the time at said buoy, said artificial resonance imposing means including brake means for halting vertical movement of said buoy at substantially the uppermost and substantially the lowermost limits of vertical travel of said buoy, means independent of said wave frequency detector means for sensing said uppermost and said lowermost limits and actuating said braking means and means interconnecting said braking means and said wave frequency detector means for releasing said braking means after a selected time interval in accordance with the pre-measured time interval between the crest and following trough and between the trough and following crest of the wave as such pre-measured time intervals were measured by said wave frequency detector means when said wave passing said buoy was passing said wave frequency detector means to release said buoy to descent under the action of gravity into the trough of said wave to its said lowermost limit of vertical travel and to ascent under the action of the buoyance in such wave through the immediately following wave crest to the said uppermost limit of vertical travel.

2. The improvements set forth in claim 1, further characterized in said brake means including a brake disc on said rotating shaft, and caliper means selectively engaging said disc; said means for sensing said uppermost and lowermost limits of vertical displacement being in the form of a zero revolutions per minute detector.

3. The method of increasing energy extracted from an ocean wave energy device including a vertically reciprocating buoy and power take off means driven by the reciprocation of said buoy by the waves, including the steps of: monitoring the contour of each wave as such wave passes a wave frequency detector means and measuring the instantaneous time interval between the crest and immediately following trough and the trough and immediately following crest of waves passing such detector which waves are to subsequently pass said buoy; braking the buoy independently of said wave frequency detector means at substantially at least one of the limits of its path of reciprocal travel in a wave which has passed the frequency detector and its frequency measured; and releasing the buoy after a selected time interval substantially in direct relationship to the time interval measured by the wve frequency detector means to bring the buoy frequency into substantial conformance with the detected instantaneous frequency of the wve at the buoy as such frequency was measured at the wave frequency detector means when the wave at the buoy was at the wave frequency detector means.

4. The method set forth in claim 3, further characterised in braking said buoy at both the substantially upper and substantially lower limits of its path or reciprocal travel.

5. In an ocean wave energy device of a type including a buoy which reciprocates in substantially vertical directions in response to successive waves of variable frequency passing therebeneath, said buoy being supported upon a substantially vertically oriented shaft and a power take off means including a shaft driven by movement of the vertical shaft, the improvement comprising: detector means for detecting the frequency of successive wave crests and wave troughs passing the detector and which will subsequently pass said buoy by monitoring the contour of each wave as such wave passes said frequency detector means and measuring the time interval between the crest and following trough and between the trough and following crest of each such wave and means for imposing an artificial resonance to said buoy whereby said buoy resonance may be substantially conformed to the frequency detected of the wave when said wave was at said detector means, said artificial resonance imposing means including brake means for halting vertical movement of said buoy at substantially the uppermost and substantially the lowermost limits of vertical travel of said buoy, means independent of said wave sensing means for sensing said uppermost and said lowermost limits and actuating said braking means and means interconnecting said braking means and said wave frequency detector means for releasing said braking means for vertical travel of said buoy in substantial conformance with the frequency of the wave at the buoy when said wave was at said wave frequency detector means and said frequency was measured.

6. The method of extracting predetermined amounts of energy from an ocean wave energy device including a substantially vertically reciprocating buoy and power take off means driven by the reciprocation of said buoy responsive to the waves, including the steps of: monitoring the contour of each wave and measuring the time interval between each crest and following trough and between each trough and following crest of waves passing a wave frequency detector and which will subsequently pass the buoy; braking the buoy at substantially the uppermost position and substantially the lowermost position in its reciprocal travel between the crest and the trough of the wave whose frequency has been determined; and, releasing the buoy to descend under the action of gravity into the trough of the wave to its said lowermost position and to ascend byits buoyancy in such wave through the following wave crest to its said uppermost position by releasing said brake after a time interval selected in direct relationship to the time interval between the crest and following trough and between the trough and following crest of the wave to release said buoy to descend under the action of gravity into the trough of said wave to its said lowermost limit of vertical travel and to ascend under the action of buoyancy in such wave through the immediately following crest to its said uppermost limit of vertical movement and, thereby, bring the frequency of said buoy into substantial predetermined conformance with the frequency of the wave.

* * * * *